US007429423B2

(12) United States Patent
Stark

(10) Patent No.: US 7,429,423 B2
(45) Date of Patent: Sep. 30, 2008

(54) SILICONE-CONTAINING POLYVINYL ACETALS

(75) Inventor: Kurt Stark, Weilersbach (DE)

(73) Assignee: Wacker Chemie AG, Munich (DE)

( * ) Notice: Subject to any disclaimer, the term of this patent is extended or adjusted under 35 U.S.C. 154(b) by 415 days.

(21) Appl. No.: 10/595,102

(22) PCT Filed: Aug. 12, 2004

(86) PCT No.: PCT/EP2004/009050

§ 371 (c)(1),
(2), (4) Date: Feb. 14, 2006

(87) PCT Pub. No.: WO2005/021604

PCT Pub. Date: Mar. 10, 2005

(65) Prior Publication Data

US 2006/0199020 A1 Sep. 7, 2006

(30) Foreign Application Priority Data

Aug. 21, 2003 (DE) ................................ 103 38 479

(51) Int. Cl.
*B32B 9/04* (2006.01)
*C08F 30/08* (2006.01)

(52) U.S. Cl. .................... 428/447; 428/500; 106/31.57; 526/279; 526/322; 524/588

(58) Field of Classification Search ....................... None
See application file for complete search history.

(56) References Cited

U.S. PATENT DOCUMENTS 4,277,299 A 7/1981 Cherenko et al.
6,727,336 B1 * 4/2004 Ito et al. ..................... 526/279

FOREIGN PATENT DOCUMENTS

| | | | | |
|---|---|---|---|---|
| DE | 102 15 962 | A1 | | 10/2003 |
| EP | 0 614 924 | A1 | | 9/1994 |
| EP | 1 095 953 | A2 | | 5/2001 |
| JP | 60210551 | A | | 10/1985 |
| JP | 60231704 | A | * | 11/1985 |
| JP | 02141289 | A | | 5/1990 |
| JP | 06211549 | A | | 8/1994 |
| JP | 07290847 | A | | 11/1995 |
| JP | 08073542 | A2 | | 3/1996 |
| JP | 09141801 | A | | 6/1997 |

OTHER PUBLICATIONS

Polymer Handbook, 4th Edition [1999], Chapter II.
Patent Abstract of Japan corres. to JP-A 08073542.
Patent Abstract of Japan corres. to JP-A 02141289.
Patent Abstract of Japan corres. to JP-A 06211549.
Patent Abstract of Japan corres. to JP-A 07290847.
Patent Abstract of Japan corres. to JP-A 09141801.
Patent Abstract of Japan corres. to JP-A 60210551.
Derwent Abstract corres. to DE 10215962 [AN2003-865277].

* cited by examiner

*Primary Examiner*—Marc S Zimmer
(74) *Attorney, Agent, or Firm*—Brooks Kushman P.C.

(57) ABSTRACT

Silicone-modified polyvinyl acetal copolymers are prepared by copolymerization of at least one vinyl ester monomer and a copolymerizable silicone macromer followed by hydrolysis to a partly or fully hydrolyzed polyvinyl alcohol copolymer and subsequent acetalation with at least one aldehyde. The copolymers have numerous uses in sectors where polyvinyl acetals are useful.

24 Claims, No Drawings

SILICONE-CONTAINING POLYVINYL ACETALS

CROSS-REFERENCE TO RELATED APPLICATION

This application claims priority to PCT Appln. No. PCT/EP2004/009050 filed Aug. 12, 2004, and to German application 103 38 479.0 filed Aug. 21, 2003.

BACKGROUND OF THE INVENTION

1. Field of the Invention

The invention relates to silicone-containing polyvinyl acetals, processes for the preparation thereof and the use thereof.

2. Description of the Related Art

Polyvinyl acetals have been known since as long ago as 1924, a large number of aldehydes having subsequently been used for the preparation of the corresponding polyvinyl acetals. Polyvinyl acetals are prepared in a three-stage process (polyvinyl acetate→polyvinyl alcohol→polyvinyl acetal), products which also contain vinyl alcohol units and vinyl acetate units in addition to vinyl acetal groups resulting. In particular, polyvinyl formal, polyvinyl acetacetal and polyvinyl butyral (PVB) have become important commercially. The largest field of use for polyvinyl acetals is the preparation of safety glasses in automotive construction and in architecture, plasticized polyvinyl butyral films being used as an intermediate layer in glass panes. A further field of use for polyvinyl acetals is the use in corrosion-inhibiting coatings. Inter alia because of their good pigment-binding power, polyvinyl acetals are also used as binders in finishes and especially in printing inks.

In said applications, the polyvinyl acetals are modified with silicone in certain cases. In order to improve the resistance of glass laminates having an intermediate polyvinyl acetal layer, JP-A 06-211549 recommends modifying the intermediate layer of plasticized polyvinyl acetal with silicone oil. In U.S. Pat. No. 4,277,299, the addition of polysiloxane resin as a release agent is recommended for glass laminates having a polyvinyl acetal coating. JP-A 60-210551 states that the impact strength of glass laminates having an intermediate polyvinyl butyral layer can be improved by modification with silicone oil. A disadvantage there is that, owing to the poor miscibility of silicones with polymers, the separation of the composition and migration of the silicone fraction may occur.

It is also known from the prior art that polyvinyl acetals can be modified by means of grafting or polymer-analogous reaction with silicone. JP-A 08-73542 discloses a process in which the vinyl alcohol units of a polyvinyl butyral are reacted with methacryloyl isocyanate, and unsaturated trialkoxysilanes are then grafted on. In JP-A 09-141801, polydimethylsiloxane chains are grafted onto the vinyl alcohol units of a polyvinyl acetal. JP-A 02-141289 describes the polymer-analogous reaction of, inter alia, polyvinyl butyral with a polysiloxane. In JP-A 07-290847, polyvinyl acetoacetal is reacted with an OH-terminated polysiloxane in the presence of diisocyanate. The very inconvenient syntheses which are associated with secondary reactions and may lead to mixtures or to crosslinked products are a disadvantage in the preparation of silicone-modified polyvinyl acetals by means of polymer-analogous reaction. The often unstable and frequently insufficient binding of the silicone moiety can moreover lead to phase separation and separation of the product.

SUMMARY OF THE INVENTION

It was the object of the invention to provide silicone-modified polyvinyl acetals which contain a covalently bonded silicone moiety. This and other objects are achieved by providing silicone-modified polyvinylacetals prepared by copolymerization of vinyl ester with a copolyerizable silicone macromer, hydrolysis to the corresponding polyvinyl alcohol, and subsequent acetalation.

DETAILED DESCRIPTION OF THE PREFERRED EMBODIMENT

The invention relates to silicone-containing polyvinyl acetals obtainable by means of 1) copolymerization of a) one or more vinyl esters of straight-chain or branched alkylcarboxylic acids having 1 to 15 C atoms and b) one or more silicone macromers having at least one polymerizable group and 2) subsequent hydrolysis of the copolymer to give the silicone-containing polyvinyl alcohol and 3) subsequent acetalation of the silicone-containing polyvinyl alcohol with one or more aldehydes from the group consisting of aliphatic and aromatic aldehydes having 1 to 15 C atoms.

Suitable vinyl esters a) are vinyl esters of straight-chain or branched carboxylic acids having 1 to 15 C atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 5 to 13 C atoms, for example VeoVa9$^R$ or VeoVa10$^R$ (trade names of Shell). Vinyl acetate is particularly preferred.

In addition to the proportion of vinyl ester, one or more further monomers a) may optionally be contained. A proportion thereof is then such that the proportion of vinyl ester in the silicone-containing copolymer is ≧40 mol %. Examples of further monomers a) are those from the group consisting of methacrylates and acrylates of alcohols having 1 to 15 C atoms, olefins, dienes, vinylaromatics and vinyl halides. Preferred methacrylates or acrylates are methyl acrylate, methyl methacrylate, ethyl acrylate, ethyl methacrylate, propyl acrylate, propyl methacrylate, n-butyl, isobutyl and tert-butyl acrylate, n-butyl, isobutyl and tert-butyl methacrylate, 2-ethylhexyl acrylate and norbornyl acrylate. Methyl acrylate, methyl methacrylate, n-butyl, isobutyl and tert-butyl acrylate, 2-ethylhexyl acrylate and norbornyl acrylate are particularly preferred.

Suitable dienes are 1,3-butadiene and isoprene.

Examples of polymerizable olefins are ethene and propene. Styrene and vinyltoluene may be incorporated as polymerized vinylaromatics.

From the group consisting of the vinyl halides, vinyl chloride, vinylidene chloride or vinyl fluoride is usually used, preferably vinyl chloride.

Suitable further monomers a) are also polymerizable silanes or mercaptosilanes. γ-acryloyl- or γ-meth-acryloyloxypropyltri (alkoxy) silanes, α-methacryloyloxy-methyltri (alkoxy)silanes, γ-methacryloyloxypropyl-methyldi(alkoxy) silanes, vinylalkyldi(alkoxy)silanes and vinyltri(alkoxy) silanes are preferred, it being possible to use, for example, methoxy, ethoxy, methoxyethylene, ethoxyethylene or methoxypropylene glycol ether or ethoxypropylene glycol ether radicals as alkoxy groups. Examples of these are vinyltrimethoxysilane, vinyltriethoxysilane, vinyl-tripropoxysilane, vinyltriisopropoxysilane, vinyltris-(1-methoxy)isopropoxysilane, vinyltributoxysilane, vinyltriacetoxysilane, 3-methacryloyloxypropyl-trimethoxysilane, 3-methacryloyloxypropylmethyl-dimethoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, trisacetoxyvinyl-silane and 3-(triethoxysilyl)propylsuccinic acid anhydride silane. 3-Mercaptopropyltriethoxysilane, 3-mercaptopropyltrimethoxysilane and 3-mercaptopropyl-methyldimethoxysilane are also preferred.

Further examples are functionalized (meth)acrylates, in particular epoxy-functional ones, such as glycidyl acrylate, glycidyl methacrylate, allyl glycidyl ether or vinyl glycidyl ether, or hydroxyalkyl-functional ones, such as hydroxyethyl (meth)acrylate, or substituted or unsubstituted aminoalkyl (meth)acrylates, or cyclic monomers, such as N-vinylpyrrolidone. Furthermore, one or more monomers from the group consisting of ethylenically unsaturated mono- and dicarboxylic acids, ethylenically unsaturated carboxamides and carbonitriles and monoesters of fumaric acid and maleic acid may also be used. Acrylic acid, methacrylic acid, fumaric acid, maleic acid, N-vinylformamide, acrylamide, acrylonitrile, maleic anhydride, vinylsulfonic acid, 2-acrylamido-2-methylpropanesulfonic acid and salts thereof are preferred.

Further examples are precrosslinking comonomers, such as polyethylenically unsaturated comonomers, for example divinyl adipate, diallyl maleate, allyl methacrylate, butanediol diacrylate or triallyl cyanurate, or postcrosslinking comonomers, for example acrylamidoglycolic acid (AGA), methyl methacrylamido-glycolate (MAGME), N-methylolacrylamide (NMA), N-methylolmethacrylamide, N-methylolallyl carbamate, alkyl ethers, such as the isobutoxy ether, or esters of N-methylolacrylamide, of N-methylolmethacrylamide and of N-methylolallyl carbamate.

Suitable polymerizable silicone macromers b) are those having the general formula $R^1_aR_{3-a}SiO(SiRR^1O)_b(SiR_2O)_nSiR_{3-a}R^1_a$, R being identical or different and being a monovalent, optionally substituted, alkyl radical or alkoxy radical having in each case 1 to 18 C atoms, $R^1$ being a polymerizable group, a being 0 or 1, b being from 0 to 10 and n being from 3 to 1000, and from 85 to 100% by weight of the silicone macromers containing at least one polymerizable group.

In the general formula $R^1_a\ R_{3-a}SiO(SiRR^1O)_b(SiR_2O)_nSiR_{3-a}R^1_1$, examples of radicals R are the methyl, ethyl, n-propyl, isopropyl, 1-n-butyl, 2-n-butyl, isobutyl, tert-butyl, n-pentyl, isopentyl, neopentyl and tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical, cycloalkyl radicals, such as cyclopentyl, cyclohexyl, cycoheptyl and methylcyclohexyl radicals.

The radical R is preferably a monovalent hydrocarbon radical having 1 to 6 carbon atoms, such as the methyl, ethyl, n-propyl, isopropyl, n-butyl, sec-butyl, amyl and hexyl radical, the methyl radical being particularly preferred. Preferred alkoxy radicals R are those having 1 to 6 carbon atoms, such as the methoxy, ethoxy, propoxy and n-butoxy radical, which may optionally also be substituted by oxyalkylene radicals, such as oxyethylene or oxymethylene radicals. The methoxy and ethoxy radicals are particularly preferred.

Said alkyl radicals and alkoxy radicals R may also be optionally substituted, for example by halogen, mercapto groups, epoxy-functional groups, carboxyl groups, keto groups, enamine groups, amino groups, aminoethylamino groups, isocyanato groups, aryloxy groups, alkoxysilyl groups and hydroxyl groups.

Suitable polymerizable groups $R^1$ are alkenyl radicals having 2 to 8 C atoms. Examples of such polymerizable groups are the vinyl, allyl, butenyl and acryloyloxy-alkyl and methacryloyloxyalkyl groups, the alkyl radicals containing 1 to 4 C atoms. The vinyl group and 3-methacryloyoxypropyl, methacryloyloxymethyl, acryloyloxymethyl and 3-acryloyloxypropyl groups are preferred. In this context, a polymerizable group is also to be understood as meaning a chain-transferring group, such as the mercaptoalkyl group having 1 to 6 C atoms.

In the case of the silicones only monosubstituted by unsaturated groups, α-monovinylpolydimethylsiloxanes, α-mono (3-acryloyloxypropyl)polydimethylsiloxanes, α-mono(acryloyloxymethyl)polydimethylsiloxanes, α-mono-(methacryloyloxymethyl)polydimethylsiloxanes and α-mono(3-methacryloyloxypropyl)polydimethylsiloxanes are preferred. In the case of the α-monofunctional polydimethylsiloxanes an alkyl or alkoxy radical, for example a methyl or butyl radical, is present at the other chain end.

Silicone macromers having a linear or branched structure, where R=methyl radical and where n=from 3 to 1000, preferably from 50 to 500, which contain one or two terminal (one a=1 or both a=1), polymerizable groups, or contain one or more polymerizable groups in the chain (both a=0 and b≧1), or contain one or two terminal polymerizable groups and at least one polymerizable group in the chain (one or both a=1 and b ≧1) are particularly preferred. Examples of these are polydialkylsiloxanes having one or two vinyl, acryloyloxyalkyl, methacryloyloxyalkyl or mercaptoalkyl groups, it being possible for the alkyl groups to be identical or different and said alkyl groups containing 1 to 6 C atoms. α, ω-Divinylpolydimethylsiloxanes (such as, for example, the VIPO oils of Wacker-Chemie GmbH), α, ω-di(3-acryloyloxypropyl)polydimethylsiloxanes, α, ω-di (3-metbacryloyloxypropyl)polydimethylsiloxanes, α, ω-di(acryloyloxymethyl) polydimethylsiboxanes, α, ω-di(methacryloyloxymethyl) polydimethylsiloxanes, α-monovinylpolydimethylsiloxanes, α-mono(3-acryloyloxypropyl)polydimethylsiloxanes and α-mono (3-methacryloyloxypropyl)polydimethylsiloxanes are particularly preferred. α-Mono (3-mercaptopropyl)polydimethylsiloxanes or α, ω-di(3-mercaptopropyl)polydimethylsiloxanes are also preferably used.

α, ω-Divinylpolydimethylsiloxanes are most preferred. Furthermore suitable are mixtures of linear or branched polydialkylsiloxanes without a polymerizable group, in particular polydimethylsiloxanes, with linear or branched polydialkylsiloxanes, in particular polydimethylsiloxanes, which contain one and/or two polymerizable groups, in particular vinyl groups, at the chain end. Examples of such mixtures are binary mixtures of polydialkylsiloxanes which contain a polymerizable group and polydialkylsiloxanes without a polymerizable group, and binary mixtures of polydialkylsiloxanes which contain two polymerizable groups and polydialkylsiloxanes without a polymerizable group, the proportion of nonfunctional polydialkylsiloxanes being in each case from 0.5 to 15% by weight, based on the total weight of the silicone macromers.

Ternary mixtures of polydialkylsiloxanes which contain two polymerizable groups, polydialkylsiloxanes which contain one polymerizable group and polydialkylsiloxanes without a polymerizable group are also preferred, the proportions by weight in the mixture particularly preferably being from 0.5 to 10% by weight of polydialkylsiloxane without a polymerizable group, from 5 to 50% by weight of polydialkylsiloxanes having one polymerizable group and from 40 to 90% by weight of polydialkylsiloxanes having two polymerizable groups, based in each case on the total weight of the silicone component. Said polydialkylsiloxanes and mixtures thereof are commercially available, for example Dehesive® silicones from Wacker-Chemie GmbH.

The polymerizable silicone macromers as described in EP-A 614924, or silicone macromers having a dendrimeric structure, which are mentioned in EP-A 1095953, are also suitable.

The polymerization to give the silicone-containing polyvinyl esters is effected in a known manner, preferably by mass polymerization, suspension polymerization or polymerization in organic solvents, preferably in alcohols, ketones or esters or in mixtures of these solvents. Suitable solvents and regulators are, for example, methanol, ethanol, propanol and isopropanol. The polymerization is carried out under reflux at temperatures from 20° C. to 100° C. and is initiated by means of free radicals by adding conventional initiators. Suitable free radical initiators are oil-soluble initiators, such as tert-butyl peroxy-2-ethylhexanoate, tert-butyl peroxypivalate, tert-butyl peroxyneodecanoate, dibenzoyl peroxide, tert-amyl peroxypivalate, di(2-ethylhexyl)peroxydicarbonate, 1,1-bis(tert-butylperoxy)-3,3,5-trimethylcyclohexane and di(4-tert-butylcyclohexyl) peroxydicarbonate. Azo initiators, such as azobisisobutyronitrile, are also suitable. The initiators are used in general in an amount of from 0.005 to 5.0% by weight, preferably from 0.1 to 2.0% by weight, based on total monomer.

The process from DE-A 10215962 is particularly preferred for the preparation of the silicone-containing solid resin. The preparation of organosilicone copolymers is effected by means of polymerization in a nonaqueous, organic solvent, in the presence of free radical initiators, the nonaqueous solvent used being a mixture of at least two nonaqueous solvents, at least one of which nonaqueous solvents has a transfer constant $C_s$ to vinyl acetate of $C_s>20\times10^{-4}$ at 70° C. The transfer constant $C_s$ of the nonaqueous solvents are to be found, for example, in Polymer Handbook $4^{th}$ Edition (1999), Chapter II, the values for vinyl acetate being mentioned on pages 142 to 149. Preferred solvents having $C_s>20\times10^{-4}$ at 70° C. are ethanol and isopropanol. In the case of the solvent mixtures, the proportion of solvent having $C_s>20\times10^{-4}$ is in general from 3 to 50% by weight, preferably from 5 to 30% by weight, particularly preferably from 7 to 20% by weight. Solvent mixtures comprising isopropanol are particularly preferred; a mixture of ethyl acetate and isopropanol is most preferred.

The reaction temperature is from 20° C. to 100° C., preferably from 40° C. to 80° C. In general, polymerization is effected at atmospheric pressure. In the copolymerization of monomers which are gaseous at room temperature, such as ethylene, pressure is employed, in general from 1 to 100 bar. In general, the polymerization is carried out to a solids content of from 15 to 90%, preferably a solids content of from 20 to 75%.

The molecular weight can be established in polymerization in solution in a known manner by adding regulators, by means of the solvent content, by varying the initiator concentration or varying the temperature. In a preferred embodiment for the preparation of the silicone-containing polyvinyl ester, some of the silicone component is initially introduced with the vinyl ester and optionally further comonomers and the remainder is metered in. The ratios of the comonomers at any time during the polymerization are particularly preferably approximately constant. After the end of polymerization, postpolymerization can be effected for removal of residual monomers using known methods. Volatile residual monomers and further volatile components, such as solvents or regulators, can also be removed by means of distillation, preferably under reduced pressure. In suspension polymerizations, this can also be effected by passing in steam (=stripping) to promote the procedure.

For the preparation of the hydrolysis products, i.e. the silicone-containing polyvinyl alcohols, the silicone-containing polyvinyl ester resin is hydrolyzed in alcoholic solution in a manner known to the person skilled in the art, the acidic or alkaline catalysts customary for the purpose being used. Suitable solvents are aliphatic alcohols having 1 to 6 C atoms, preferably methanol or ethanol. However, the hydrolysis can also be carried out in a mixture consisting of water and aliphatic alcohol. The silicone-containing solid resin is preferably taken up in methanol, a solids content of from 10 to 70% by weight being established. The hydrolysis or transesterification is carried out in general at temperatures of from 20° C. to 80° C., preferably from 30° C. to 60° C. On reaching the desired degree of hydrolysis, in general from 30 to 100 mol %, preferably from 60 to 90 mol %, the transesterification is stopped. Acidic catalysts are, for example, strong mineral acids, such as hydrochloric acid or sulfuric acid, or strong organic acids, such as aliphatic or aromatic sulfonic acids. Alkaline catalysts are preferably used. These are, for example, the hydroxides, alcoholates and carbonates of alkali metals or alkaline earth metals. The catalysts are used in the form of the aqueous or alcoholic solutions thereof. The amounts of alkaline catalyst used are in general from 0.2 to 20.0 mol %, based on organosilicone polymer.

For the acetalation, the (partly or completely) hydrolyzed silicone-containing polyvinyl esters are preferably taken up in an aqueous medium. Usually, a solids content of the aqueous solution of from 5 to 40% by weight is established. The acetalation is effected in the presence of acidic catalysts, such as hydrochloric acid, sulfuric acid, nitric acid or phosphoric acid. The pH of the solution is preferably adjusted to values of <1 by adding 20% strength hydrochoric acid. After addition of the catalyst, the solution is cooled to, preferably, from −10° C. to +20° C. The acetalation reaction is initiated by adding the proportion of aldehyde.

Preferred aldehydes from the group consisting of the aliphatic aldehydes having 1 to 15 C atoms are formaldehyde, acetaldehyde, propionaldehyde and most preferably butyraldehyde, or a mixture of butyraldehyde and acetaldehyde. For example, benzaldehyde or derivatives thereof may be used as aromatic aldehydes. The added amount of aldehyde depends on the desired degree of acetalation. Since the acetalation takes place with virtually complete conversion, the added amount can be determined by simple stoichiometric calculation. After the end of the addition of the aldehyde, the acetalation is completed by heating the batch to 10° C. to 60° C. and stirring for several hours, preferably from 1 to 6 hours, and the pulverulent reaction product is isolated by filtration and a downstream washing step. For stabilization, alkalis may furthermore be added. During the precipitation and the aftertreatment, emulsifiers can be employed in order to stabilize the aqueous suspension of the silicone-containing polyvinyl acetal.

For stabilization of the aqueous suspension of the silicone-containing polyvinyl acetal, it is possible to use anionic, zwitterionic, cationic and nonionic emulsifiers and protective colloids. Zwitterionic or anionic emulsifiers are preferably used, optionally also in mixtures. Preferably used nonionic emulsifiers are condensates of ethylene oxide (EO) or propylene oxide (PO) with linear or branched alcohols having 6 to 24 carbon atoms, alkylphenols or linear or branched carboxylic acids of 6 to 24 carbon atoms, and block copolymers of ethylene oxide and propylene oxide. Suitable anionic emulsifiers are, for example, alkylsulfates, alkanesulfonates, alkylarylsulfates, and sulfates or phosphates of condensates of ethylene oxide with linear or branched alkyl alcohols and with 2 to 25 EO units, alkylphenols, and mono- or diesters of sulfosuccinic acid. Suitable zwitterionic emulsifiers are, for example, alkyldimethylamine oxides, the alkyl chain having 6 to 20 C atoms. Cationic emulsifiers which may be used are, for example, tetraalkylammonium halides, such as $C_6$-$C_{20}$-alkyltrimethylammonium bromide. Trialkylamines having a relatively long (≧5 C atoms) and two relatively short hydrocarbon radicals (<5 C atoms) may likewise be used, which trialkylamines are present in protonated form in the course of the acetalation, which takes place under strongly acidic conditions, and can act as an emulsifier. The amount of emulsifier is from 0.01 to 20% by weight, based on the total weight of the polyvinyl acetal in the mother liquor. An amount of from 0.01 to 2% by weight of emulsifier is preferred, and an amount of from 0.01 to 1% by weight of emulsifier is particularly preferred, based on the silicone-containing polyvinyl acetal.

Particularly preferred are silicone-containing polyvinyl acetals having from 0 to 30% by weight, preferably from 1 to 25% by weight, of vinyl ester units, in particular vinyl acetate units;

having from 5 to 95% by weight, preferably from 10 to 25% by weight, of vinyl alcohol units;

having from 3 to 94.9% by weight, preferably from 40 to 60% by weight, of vinyl acetal units, in particular vinyl butyral or vinyl acetoacetal units or a mixture of these units; and having a proportion of silicone of from 0.1 to 45% by weight, preferably from 5 to 35% by weight, based in each case on the total weight of the silicone-containing polyvinyl acetal, the data in % by weight summing to 100% by weight.

Silicone-containing polyvinyl acetals which have substantially better properties in many areas than known, unmodified polyvinyl acetals used to date are obtainable by the procedure according to the invention. Thus, by using silicone-containing polyvinyl acetals according to the invention, the water resistance, waterproof properties or the water repellency of coatings is substantially increased, and furthermore the coating has a pronounced separating effect or pronounced release behavior. Coatings which contain the silicone-containing polyvinyl acetals according to the invention are furthermore distinguished by a particular smoothness of the surface. Although the glass transition temperature Tg of the silicone-containing polyvinyl acetals according to the invention is reduced compared with those of the unmodified polyvinyl acetals, the silicone-containing polyvinyl acetals nevertheless furthermore exhibit better blocking stability, which is due to the silicone content.

The use of the silicone-containing polyvinyl acetals is particularly advantageous, especially in printing inks. By combining an organic moiety based on polyvinyl acetal and a silicone moiety, the two moieties being covalently linked to one another, the silicone-containing polyvinyl acetals have amphiphilic properties in many solvents. This leads firstly to substantially better dispersing of pigment and secondly to the establishment of a very low viscosity even at a relatively higher binder content, with the result that a higher degree of pigmenting is also possible. A 10% strength ethanolic solution of the silicone-containing polyvinyl acetals according to the invention furthermore has a substantially lower viscosity than the analogous solution of conventional polyvinyl acetals having the same molecular weight.

Depending on the degree of modification with silicone, i.e. depending on the proportion of silicone, the silicone-containing polyvinyl acetals can also dissolve in solvent in which the conventional polyvinyl acetals do not dissolve. For example, aliphatic solvents, such as hexane, cyclohexane, gasoline, heptane, octane, etc., may be mentioned here. Using the silicone-containing polyvinyl acetals according to the invention, it is thus possible to prepare printing inks which are suitable for a large number of printing processes.

Suitable printing ink formulations are known to the person skilled in the art and generally contain from 5 to 50% by weight of pigments, for example diazo or phthalocyanine pigments, from 4 to 40% by weight of silicone-containing polyvinyl acetal binder and solvents, for example alcohols, such as ethanol, or esters, such as ethyl acetate. Further additives, such as retardants, adhesion promoters, plasticizers and other additives, such as, for example, fillers or waxes, may optionally also be contained.

The silicone-containing polyvinyl acetals are also very suitable for the laminated safety glass and glass laminates, high-performance safety glass or window films.

Furthermore, water-soluble, partly acetalated, silicone-containing polyvinyl acetals which may also contain ionic groups, such as carboxylate groups or sulfonate groups, serve as a protective colloid, for example for aqueous dispersions in the polymerization in an aqueous medium, and in the preparation of dispersion powders redispersible in water. Water-soluble (solubility of more than 10 g/l in water under standard temperature and pressure conditions) polyvinyl acetals having a degree of acetalation of from 1 to 20 mol %, in particular from 3 to 16 mol %, are preferred. By the use of such protective colloids, it is possible to introduce the advantageous properties of silicones into dispersions or powders in a simple manner.

The silicone-containing polyvinyl acetals can furthermore advantageously be used in water-based finishes or finishes based on organic solvents. Some advantages have already been mentioned above. Further fields of use of the silicone-containing polyvinyl acetals are the use as binders in corrosion inhibitors, the high hydrophobicity and the water-repellent behavior being mentioned as advantages. Furthermore, the silicone-containing polyvinyl acetals are also suitable as binders in the ceramics industry, especially as binders for ceramic green compacts. The use as binders for ceramic powders and metal powders in powder injection molding and as binders for the internal coating of cans may also be mentioned.

Further applications are the coating of wood, metals, glass, plastics and paper; the use as release agents or for the production of release coatings; the use as water repellents and modifiers; the use in cosmetic formulations, for textile coating or for the treatment of textiles; the use as an additive in the building sector for cement-containing and non-cement-containing systems, as an additive for antifoam formulations; the use in building protection for the production of weather-resistant coatings or sealants, and in the polish sector.

The following examples serve for further illustrating the invention without limiting it in any manner:

EXAMPLES

Raw Materials:

PDMS mixture (Wacker Dehesive® 929):

Mixture of three polydimethylsiloxanes having about 100 $SiOMe_2$ units, which contains 5% by weight of unfunctionalized polydimethylsiloxane, 35% by weight of α-monovinyl-functionalized polydimethylsiloxane and 60% by weight of α, ω-divinyl-functionalized polydimethylsiloxane.

VIPO 200: α, ω-divinylpolydimethylsiloxane having about 100 $SiOMe_2$ units

1. Preparation of vinyl acetate/polydimethylsiloxane copolymers:

Example a)

54.65 kg of ethyl acetate, 303.33 g of PDMS mixture (=Dehesive 929), 5.47 kg of isopropanol, 44.71 g of PPV (tert-butyl perpivalate, 75% strength solution in aliphatics) and 2.73 kg of vinyl acetate were initially introduced into a 120 l stirred vessel having an anchor stirrer, reflux condenser and metering means. The initially introduced mixture was then heated to 70° C. at a stirrer speed of 95 rpm. After the internal temperature of 70° C. had been reached, the initiator metering (4.10 kg of ethyl acetate and 173.91 g of PPV) was started at a rate of 826 g/h. Ten minutes after the start of the initiator metering, the monomer metering (2.43 kg of PDMS mixture and 21.86 kg of vinyl acetate) was begun at a rate of 6.08 kg/h. The initiator metering extended over a period of 310 min, and the monomer metering ended 60 min earlier. After the end of both meterings, polymerization was continued for a further 120 min at 70° C. The polymer solution obtained was then heated up for distillation (solvent exchange), the distillate continuously being replaced by methanol. This process was repeated until the solvent was free of ethyl acetate and isopropanol.

Analyses: Solids content (SC): 45.6% (in methanol), GC analysis: residual VAc content 20 ppm; residual ethyl acetate: 1100 ppm, acid number (AN): 3.36 mg KOH/g, viscosity Höppler, 10% strength solution in ethyl acetate)=1.34 mPa·s; SEC $M_w$=13,502 g/mol, $M_n$=5075 g/mol, polydispersity=2.66;

glass transition temperature (Tg): Tg=30.1° C.

Composition of the resin according to $^1$H-NMR (CDCl3): 10.75% by weight (12.28 mol%) of PDMS, 89.25% by weight (87.72 mol%) of PVAc.

Example b)

51.57 kg of ethyl acetate, 481.63 g of PDMS mixture (Dehesive 929), 8.09 kg of isopropanol, 51.78 g of PPV (tert-butyl perpivalate, 75% strength solution in aliphatics) and 2.53 kg of vinyl acetate were initially introduced into a 120 l stirred vessel having an anchor stirrer, reflux condenser and metering means. The initially introduced mixture was then heated to 70° C. at a stirrer speed of 95 rpm. After the internal temperature of 70° C. had been reached, the initiator metering (4.07 kg of ethyl acetate and 201.33 g of PPV) was started at a rate of 827 g/h. Ten minutes after the start of the initiator metering, the monomer metering (3.86 kg of PDMS mixture and 20.25 kg of vinyl acetate) was begun at a rate of 6.03 kg/h. The initiator metering extended over a period of 310 min, and the monomer metering ended 60 min earlier. After the end of both meterings, polymerization was continued for a further 120 min at 70° C. The polymer solution obtained was then heated up for distillation (solvent exchange), the distillate continuously being replaced by methanol. This process was repeated until the solvent was free of ethyl acetate and isopropanol.

Analyses: SC: 50.0% (in methanol), GC analysis: residual VAc content 420 ppm; residual ethyl acetate: 1.06%, acid number: 2.80mg KOH/g, viscosity (Höppler, 10% strength solution in ethyl acetate)=1.39 mPa·s; SEC $M_w$=13,640 g/mol, $M_n$=4497 g/mol, polydispersity=3.03;

glass transition temperature (Tg): Tg =28.60° C.

Composition of the resin according to $^1$H-NMR ($CDCl_3$): 17.46% by weight (19.75 mol %) of PDMS, 82.54% by weight (80.25 mol %) of PVAc.

Example c)

49.97 kg of ethyl acetate, 651.01 g of PDMS mixture (Dehesive 929), 9.38 kg of isopropanol, 58.88 g of PPV (tert-butyl perpivalate, 75% strength solution in aliphatics) and 2.34 kg of vinyl acetate were initially introduced into a 120 l stirred vessel having an anchor stirrer, reflux condenser and metering means. The initially introduced mixture was then heated to 70° C. at a stirrer speed of 95 rpm. After the internal temperature of 70° C. had been reached, the initiator metering (4.05 kg of ethyl acetate and 228.88 g of PPV) was started at a rate of 829 g/h. Ten minutes after the start of the initiator metering, the monomer metering (5.21 kg of PDMS mixture and 18.77 kg of vinyl acetate) was begun at a rate of 6.0 kg/h. The initiator metering extended over a period of 310 min, and the monomer metering ended 60 min earlier. After the end of both meterings, polymerization was continued for a further 120 min at 70° C. The polymer solution obtained was then heated up for distillation (solvent exchange), the distillate continuously being replaced by methanol. This process was repeated until the solvent was free of ethyl acetate and isopropanol.

Analyses: SC: 52.9% (in methanol), GC analysis: residual VAc content 60 ppm; residual ethyl acetate: 2.0%, AN: 2.24 mg KOH/g, viscosity (Höppler, 10% strength solution in ethyl acetate)=1.23 mPa·s; SEC $M_w$=10,777 g/mol, $M_n$=3626 g/mol, polydispersity =2.97; glass transition temperature (Tg): Tg=26.2° C.

Example d)

51.70 kg of ethyl acetate, 8.11 kg of isopropanol, 301.79 g of VIPO 200, 51.91 g of PPV (tert-butyl perpivalate, 75% strength solution in aliphatics) and 2.72 kg of vinyl acetate were initially introduced into a 120 1 stirred vessel having an anchor stirrer, reflux condenser and metering means. The initially introduced mixture was then heated to 70° C. at a stirrer speed of 95 rpm. After the internal temperature of 70° C. had been reached, the initiator metering (4.08 kg of ethyl acetate and 201.84 g of PPV (tert-butyl perpivalate, 75% strength solution in aliphatics) was started at a rate of 829 g/h. Ten minutes after the start of the initiator metering, the monomer metering (2.42 kg of VIPO 200 and 21.75 kg of vinyl acetate) was begun at a rate of 6.05 kg/h. The initiator metering extended over a period of 310 min, and the monomer metering ended 60 min earlier. After the end of both meterings, polymerization was continued for a further 120 min at 70° C. After this postreaction time, the vessel was heated up for distillation, during this procedure the polymer solution being concentrated in each case to a solids content of about 95% and then being diluted again to a solids content of 50% with methanol. This process was repeated 3 times altogether (demonomerization and solvent exchange).

Analyses: SC: 48.5% (in methanol), GC analysis: residual VAc content<10 ppm; residual ethyl acetate: 730 ppm; acid number: 11.22 mg KOH/g, viscosity (Höppler, 10% strength solution in ethyl acetate)=1.25 mPa·s; SEC $M_w$=14,500 g/mol, $M_n$5612, polydispersity=2.58;

glass transition temperature (Tg): Tg=26.5 0° C.

Composition of the resin according to $^1$H-NMR ($CDCl_3$): 10.68% by weight (12.21 mol %) of PDMS, 89.32% by weight (87.79 mol %) of PVAc.

Example e)

38.84 kg of ethyl acetate, 6.57 kg of isopropanol, 1010 g of VIPO 200, 80.27 g of PPV (tert-butyl perpivalate, 75% strength solution in aliphatics) and 3.66 kg of vinyl acetate were initially introduced into a 120 l stirred vessel having an anchor stirrer, reflux condenser and metering means. The initially introduced mixture was then heated to 70° C. at a stirrer speed of 95 rpm. After the internal temperature of 70° C. had been reached, the initiator metering (6.31 kg of ethyl acetate and 312.12 g of PPV (tert-butyl perpivalate, 75% strength solution in aliphatics) was started at a rate of 1282 g/h. Ten minutes after the start of the initiator metering, the monomer metering (8.13 kg of VIPO 200 and 29.25 kg of vinyl acetate) was begun at a rate of 9.35 kg/h. The initiator metering extended over a period of 310 min, and the monomer metering ended 60 min earlier. After the end of both meterings, polymerization was continued for a further 120 min at 70° C. After this postreaction time, the vessel was heated up for distillation, during this procedure the polymer solution being concentrated in each case to a solids content of about 95% and then being diluted again to a solids content of 50% with methanol. This process was repeated 3 times altogether (demonomerization and solvent exchange).

Analyses: SC: 48.3% (in methanol), GC analysis: residual VAc content<10 ppm; residual ethyl acetate: 5520 ppm; residual isopropanol: 1200 ppm; acid number: 0 mg KOH/g, viscosity (Höppler, 10% strength solution in ethyl acetate) =1.65 mPa·s; SEC $M_w$=31,813 g/mol, $M_n$=6451, polydispersity=4.93;

glass transition temperature (Tg): Tg=25.90° C.

Composition of the resin according to $^1$H-NMR (CDCl3): 23.83% by weight (26.68 mol %) of PDMS, 76.17% by weight (73.32 mol %) of PVAc.

2. Hydrolysis of the vinyl acetate/polydimethyl-silaoxane colpolymer for the preperation of the silicone-containing polyvinyl alcohols:

Example f)

17.8% by Weight of Silicone 26.3 kg of a 45.6% strength polymer solution in methanol—prepared according to example a)—were initially introduced into a 120 l stirred vessel (at atmospheric pressure) having a reflux condenser, metering means and an anchor stirrer and diluted to a solids content of about 20% with methanol. This solution was then heated to 35° C. 220 ml of 45% strength aqueous/methanolic sodium hydroxide solution were then added rapidly. 11 min after the addition of the alkali, the pH was adjusted to about 7 with concentrated acetic acid. In order to obtain the precipitated polyvinyl alcohol as an aqueous solution, the suspension was heated up for distillation and the distillate was replaced successively by water. This process was repeated until all the methanol had been replaced by water.

Aqueous polyvinyl alcohol solution—analyses:

SC: 11.3%; AN: 0 mg KOH/g; pH (4% strength in water): 6.5; saponification number (SN): 87.15 mg KOH/g;

VOC (volatile organic compounds) (methanol): 8 ppm

Composition according to $^1$H-NMR (in DMSO with trifluoroacetic acid as a shift reagent): 13.9% by weight (8.2 mol %) of vinyl acetate, 68.3% by weight (79.5 mol %) of vinyl alcohol, 17.8% by weight (12.3 mol %) of PDMS.

Example g)

26.0% by Weight of Silicone

Procedure as for example f), but 13 min hydrolysis time. The resin from example b) was hydrolyzed.

Aqueous polyvinyl alcohol solution—analyses: SC: 11.4%; AN: 0 mg KOH/g; pH (4% strength in water): 6.74; SN: 96.33 mg KOH/g;

VOC (methanol): 590 ppm

Composition according to $^1$H-NMR (in DMSO with trifluoroacetic acid as a shift reagent): 15.0% by weight (9.3 mol %) of vinyl acetate, 59.0% by weight (71.8 mol %) of vinyl alcohol, 26.0% by weight (18.9 mol %) of PDMS.

Example h)

32.9% by Weight of Silicone

Procedure as for example f), but 11 min hydrolysis time. The resin from example c) was hydrolyzed.

Aqueous polyvinyl alcohol solution—analyses:

SC: 10.95%; AN: 0 mg KOH/g; pH (4% strength in water): 6.79; SN: 45.5 mg KOH/g;

VOC (methanol): not determined

Composition according to $^1$H-NMR (in DMSO with trifluoroacetic acid as a shift reagent): 7.9% by weight (4.9 mol %) of vinyl acetate, 59.2% by weight (71.5 mol %) of vinyl alcohol, 32.9% by weight (23.6 mol %) of PDMS.

Example i)

16.26% by Weight of Silicone 21.0 kg of a 48.0% strength polymer solution of the resin from example d) in methanol were initially introduced into a 120 l stirred vessel (at atmospheric pressure) having a reflux condenser, metering means and an anchor stirrer and diluted to a solids content of about 20.8% with methanol. This solution was then heated to 35° C. 185 ml of 45% strength aqueous/methanolic sodium hydroxide solution were then added rapidly. Exactly 10 min after the addition of the alkali, the pH was adjusted to about 7.6 with concentrated acetic acid. In order to obtain the precipitated polyvinyl alcohol as an aqueous solution, the suspension was heated up for distillation and the distillate was replaced successively by water. This process was repeated until all the methanol had been replaced by water.

Aqueous polyvinyl alcohol solution—analyses:

SC: 8.25%; AN: 2.24 mg KOH/g; pH (4% strength in water): 6.3; (SN): 126.7 mg KOH/g;

VOC (methanol): not determined

Composition according to $^1$H-NMR (in DMSO with trifluoroacetic acid as a shift reagent): 21.35% by weight (13.14 mol %) of vinyl acetate, 62.39% by weight (75.22 mol %) of vinyl alcohol, 16.26% by weight (11.64 mol %) of PDMS.

Example j)

37.16% by Weight of Silicone 20.7 kg of a 48.3% strength polymer solution of the resin from example e) in methanol were initially introduced into a 120 l stirred vessel (at atmospheric pressure) having a reflux condenser, metering means and an anchor stirrer and diluted to a solids content of 29.2% with methanol. This solution was then heated to 35° C. 217 ml of 45% strength aqueous/methanolic sodium hydroxide solution were then added rapidly. 440 seconds after the addition of the alkali, the pH was adjusted to about 7.7 with concentrated acetic acid. In order to obtain the precipitated polyvinyl alcohol as an aqueous solution, the suspension was heated up for distillation and the distillate was replaced successively by water. This process was repeated until all the methanol had been replaced by water.

Aqueous polyvinyl alcohol solution—analyses:

SC: 12.23%; AN: 4.49 mg KOH/g; pH (4% strength in water): 7.2; (SN): 35.1 mg KOH/g;

Composition according to $^{1}$H-NMR (in DMSO with trifluoroacetic acid as a shift reagent): 4.52% by weight (2.79 mol %) of vinyl acetate, 58.32% by weight (70.53 mol %) of vinyl alcohol, 37.16% by weight (26.68 mol %) of PDMS.

3. Preparation of the Silicone-Containing Polyvinyl Acetals

Example 1

930 ml of distilled water and 3006 ml of an 8.25% strength aqueous solution of the silicone-containing polyvinyl alcohol from example i), viscosity 1.6 mPa·s (DIN 53015; Höppler method; 4% strength aqueous solution) were initially introduced into a 6 liter glass reactor. The initially introduced mixture was cooled to 0° C. in the course of one hour with stirring. 190 ml of butyraldehyde, precooled to −4° C., were then added in a period of 5 minutes. 1114 ml of 20% strength HCl, precooled to −4° C., were then added at an internal temperature of −0.5° C. The temperature increased briefly as a result to 0.5° C. A temperature of −3.5° C. was established in the course of 30 minutes by cooling. During the cooling, the initially clear batch became turbid at about −1.6° C., and the product was precipitated only 5 minutes after the beginning of the turbidity. After a reaction time of 40 minutes at −3.5° C., the temperature was increased to 15° C. over a period of 3.0 hours, and this temperature was maintained for a further 2 hours. Thereafter, the product was filtered and was washed under running, distilled water until the filtrate was neutral. Drying was then effected to a solids content of at least 98%, initially at 22° C., and then at 30° C. in a vacuum drying oven.

A silicone-containing polyvinyl butyral in the form of a white powder having 13.4% by weight (28.2 mol %) of vinyl alcohol units, 16.9% by weight (18.2 mol %) of vinyl acetate units, 56.5% by weight (37.0 mol %) of vinyl butyral units and 13.2% by weight (16.6 mol %) of polydimethylsiloxane units was obtained (evaluation by 1H-NMR in $CDCl_3$ with trifluoroacetic acid as a shift solvent).

The viscosity (DIN 53015; Höppler method; 10% strength ethanolic solution) was 3.9 mPa·s. The ethanolic solution comprising the silicone-containing polyvinyl butyral had a single phase and was transparent.

Glass transition temperature (Tg): Tg=49.2° C.

Example 2

930 ml of distilled water and 3006 ml of an 8.25% strength aqueous solution of the silicone-containing polyvinyl alcohol from example i), viscosity 1.6 mPa·s (DIN 53015; Höppler method; 4% strength aqueous solution) were initially introduced into a 6 liter glass reactor. The initially introduced mixture was cooled to 0° C. in the course of one hour with stirring. 190 ml of butyraldehyde, precooled to −4° C., were then added in a period of 5 minutes. Further cooling to an internal temperature of −3.7° C. was effected. At this temperature, 1114 ml of 20% strength HCl, precooled to −4° C., were added in order to induce the precipitation. The temperature increased as a result briefly to −2.5° C. Within a very short time, the mixture was cooled again to −3.0° C. After a reaction time of 40 minutes at −3.0° C., the temperature was increased to 7.5° C. over a period of 1 hour and 20 minutes, and this temperature was maintained for a further 2 hours. Thereafter, the precipitated product was filtered off and was washed under running, distilled water until the filtrate was neutral. Drying to a solids content of at least 98% was then effected, initially at 22° C., and then at 30° C. in a vacuum drying oven.

A silicone-containing polyvinyl butyral in the form of a white powder having 16.3% by weight (33.0 mo %) of vinyl alcohol units, 16.8% by weight (17.3 mol %) of vinyl acetate units, 53.3% by weight (33.4 mol %) of vinyl butyral units and 13.6% by weight (16.3 mol %) of polydimethylsiloxane units was obtained (evaluation by 1H-NMR in $CDCl_3$ with trifluoroacetic acid as a shift solvent).

The viscosity (DIN 53015; Höppler method; 10% strength ethanolic solution) was 4.1 mPa·s. The ethanolic solution comprising the silicone-containing polyvinyl butyral had a single phase and was transparent.

Glass transition temperature (Tg): Tg=51.6° C.

Example 3

650 ml of distilled water and 3478 ml of an 8.25% strength aqueous solution of the silicone-containing polyvinyl alcohol from example i), viscosity 1.6 mPa·s (DIN 53015; Höppler method; 4% strength aqueous solution) were initially introduced into a 6 liter glass reactor. A pH of 1.0 was established with 120 ml of 20% strength hydrochloric acid. The initially introduced mixture was cooled to 4.5° C. with stirring. 100 ml of acetaldehyde were added in a period of 5 minutes. The temperature increased to 6.2° C. Cooling to an internal temperature of 1.0° C. was then effected. 20 minutes after addition of the acetaldehyde, 128 ml of butyraldehyde were added at 1.0° C. During this procedure, the temperature increased to 3.0° C. The mixture was cooled again to 1.0° C., and the precipitation was induced by adding 706 ml of 20% strength HCl. During this procedure, the temperature increased to 5° C. and the product was precipitated. The suspension was cooled to 4.0° C. After a reaction time of 40 minutes at 4.0° C., the temperature was increased to 18° C. over a period 3 hours, and this temperature was maintained for a further 2 hours. Thereafter, the product was filtered and was washed under running, distilled water until the filtrate was neutral. Drying was then effected to a solids content of at least 98%, initially at 22° C., and then at 30° C. in a vacuum drying oven.

A silicone-containing, mixed polyvinyl acetal in the form of a white powder having 12.0% by weight (24.4 mol %) of vinyl alcohol units, 18.3% by weight (19.0 mol %) of vinyl acetate units, 54.8% by weight (38.7 mol %) of vinyl acetal units and 14.9% by weight (17.9 mol %) of polydimethylsiloxane units was obtained (evaluation by 1H-NMR in $CDCl_3$ with trifluoroacetic acid as a shift solvent).

The viscosity (DIN 53015; Höppler method; 10% strength ethanolic solution) was 3.6 mPa·s. The ethanolic solution comprising the silicone-containing polyvinyl acetal had a single phase and showed very slight colloidal turbidity (almost transparent).

Glass transition temperature (Tg): Tg=63.4° C.

Example 4

1670 ml of distilled water and 2255 ml of an 11.0% strength aqueous solution of the silicone-containing polyvinyl alcohol from example h), viscosity 1.11 mPa·s (DIN 53015; Höppler method; 4% strength aqueous solution) were initially introduced into a 6 liter glass reactor. The initially introduced mixture was cooled to 0° C. with stirring. 152 ml of butyraldehyde, precooled to −4° C., were then added in a period of 5 minutes and the batch was cooled to −2.0° C. At this temperature, 1114 ml of 20% strength HCl, precooled to −4° C., were added in order to induce the precipitation. The temperature increased as a result briefly to 1.0° C. A temperature of −2.0° C. was established in the course of 30 minutes by cooling. During the cooling, the initially clear batch became turbid at about −1.4° C., and the product was precipitated only 5 minutes after the beginning of the turbidity. After a reaction time of 40 minutes at −2.0° C., the temperature was increased to 15° C. over a period of 3 hours, and this temperature was maintained for a further 2 hours. Thereafter, the product was filtered and was washed under running, distilled water until the filtrate was neutral. Drying to a solids content of at least 98% was then effected, initially at 22° C., and then at 30° C. in a vacuum drying oven. A silicone-containing polyvinyl butyral in the form of a white powder having 13.6% by weight (27.7 mol %) of vinyl alcohol units, 8.4% by weight (8.7 mol %) of vinyl acetate units, 53.1% by weight (33.5 mol %) of vinyl butyral units and 24.9% by weight (31 mol %) of polydimethylsiloxane units was obtained (evaluation by $^{1}$H-NMR in $CDCl_3$ with trifluoroacetic acid as a shift solvent).

The viscosity (DIN 53015; Höppler method; 10% strength ethanolic solution) was 2.9 mPa·s. The ethanolic solution comprising the silicone-containing polyvinyl butyral had a single phase and colloidal turbidity (was milky).

Glass transition temperature (Tg): Tg=46.9° C.

Example 5

1670 ml of distilled water and 2255 ml of an 11.0% strength aqueous solution of the silicone-containing polyvinyl alcohol from example f), viscosity 1.8 mPa·s (DIN 53015; Höppler method; 4% strength aqueous solution) were initially introduced into a 6 liter glass reactor. The initially introduced mixture was cooled to 0° C. with stirring. 152 ml of butyraldehyde, precooled to −4° C., were then added in a period of 5 minutes and the batch was cooled to −2.0° C. At this temperature, 1114 ml of 20% strength HCl, precooled to −4° C., were added in order to induce the precipitation. The temperature increased as a result briefly to 1.0° C. A temperature of −2.0° C. was established in the course of 30 minutes by cooling. During the cooling, the initially clear batch became turbid at about 0.5° C., and the product was precipitated only 5 minutes after the beginning of the turbidity. After a reaction time of 40 minutes at −2.0° C., the temperature was increased to 15° C. over a period of 3 hours, and this temperature was maintained for a further 2 hours. Thereafter, the product was filtered and was washed under running, distilled water until the filtrate was neutral. Drying to a solids content of at least 98% was then effected, initially at 22° C., and then at 30° C. in a vacuum drying oven. A silicone-containing polyvinyl butyral in the form of a white powder having 14.9% by weight (31.1 mol %) of vinyl alcohol units, 14.7% by weight (15.7 mol %) of vinyl acetate units, 57.8% by weight (37.5 mol %) of vinyl butyral units and 12.6% by weight (15.7 mol %) of polydimethylsiloxane units was obtained (evaluation by 1H-NMR in $CDCl_3$ with trifluoroacetic acid as a shift solvent).

The viscosity (DIN 53015; Höppler method; 10% strength ethanolic solution) was 3.9 mPa·s. The ethanolic solution comprising the silicone-containing polyvinyl butyral had a single phase and slight colloidal turbidity (was almost transparent).

Glass transition temperature (Tg): Tg=50.9° C.

Example 6

1770 ml of distilled water and 2140 ml of an 11.6% strength aqueous solution of the silicone-containing polyvinyl alcohol from example g), viscosity 1.6 mPa·s (DIN 53015; höppler metbod: 4% strength aqueous solution) were initially introduced into a 6 liter glass reactor. The initially introduced mixture was cooled to 0° C. with stirring. 152 ml of butyraldehyde, precooled to −4° C., were added in a period of 5 minutes and the batch was cooled to −1.0° C. At this temperature, 1114 ml of 20% strength HCl, precooled to −4° C., were added in order to induce the precipitation. The temperature increased as a result briefly to 1.6° C. A temperature of −1.0° C. was established in the course of 30 minutes by cooling. During the cooling, the initially clear batch became turbid at about 0.6° C. and the product was precipitated only 5 minutes after the beginning of the turbidity. After a reaction time of 40 minutes at −1.0° C., the temperature was increased to 23° C. over a period of 3.5 hours, and this temperature was maintained for a further 2 hours. Thereafter, the product was filtered and was washed under running, distilled water until the filtrate was neutral. Drying to a solids content of at least 98% was then effected, initially at 22° C., and then at 30° C. in a vacuum drying oven. A silicone-containing polyvinyl butyral in the form of a white powder having 12.1% by weight (25.4 mol %) of vinyl alcohol units, 12.4% by weight (13.3 mol %) of vinyl acetate units, 54.6% by weight (35.4 mol %) of vinyl butyral units and 20.9% by weight (25.9 mol %) of polydimethylsiloxane units was obtained (evaluation by 1H-NMR in $CDCl_3$ with trifluoroacetic acid as a shift solvent).

The viscosity (DIN 53015; Höppler method; 10% strength ethanolic solution) was 3.4 mPa·s. The ethanolic solution comprising the silicone-containing polyvinyl butyral had a single phase and colloidal turbidity (was semitransparent and translucent).

Glass transition temperature (Tg): Tg=46.4° C.

Example 7

1610 ml of distilled water and 2480 ml of an 11.6% strength aqueous solution of the silicone-containing polyvinyl alcohol from example g), viscosity 1.6 mPa·s (DIN 53015; Höppler method; 4% strength aqueous solution) were initially introduced into a 6 liter glass reactor. A pH of 1.0 was established with 120 ml of 20% strength hydrochloric acid. The initially introduced mixture was cooled to 5.0° C. with stirring. 80 ml of acetaldehyde were added in a period of 5 minutes. The temperature increased to 6.2° C. Cooling to an internal temperature of 2.0° C. was then effected. 20 minutes after addition of the acetaldehyde, 102 ml of butyraldehyde were added at 2.0° C. During this procedure, the temperature increased to 3.2° C. The mixture was cooled again to 2.0° C., and the precipitation was induced by adding 706 ml of 20% strength HCl. During this procedure, the temperature increased to 5.5° C. and the product was precipitated. The suspension was cooled to 4.0° C. After a reaction time of 40 minutes at 4.0° C., the temperature was increased to 25° C. over a period of 3.5 hours, and this temperature was maintained for a further 2 hours. Thereafter, the product was filtered and was washed under running, distilled water until the filtrate was neutral. Drying was then effected to a solids content of at least 98%, initially at 22° C., and then at 30° C. in a vacuum drying oven.

A silicone-containing, mixed polyvinyl acetal in the form of a white powder having 10.2% by weight (20.8 mol %) of vinyl alcohol units, 12.9% by weight (13.4 mol %) of vinyl acetate units, 54.4% by weight (38.6 mol %) of vinyl acetal units and 22.5% by weight (27.2 mol %) of polydimethylsiloxane units was obtained (evaluation by 1H-NMR in $CDCl_3$ with trifluoroacetic acid as a shift solvent).

The viscosity (DIN 53015; Hbppler method; 10% strength ethanolic solution) was 3.4 mPa·s. The ethanolic solution comprising the silicone-containing polyvinyl acetal had a single phase and colloidal turbidity (was semitransparent and translucent).

Glass transition temperature (Tg): Tg=62.9° C.

Example 8

1880 ml of distilled water and 2035 ml of a 12.2% strength aqueous solution of the silicone-containing polyvinyl alcohol from example j), viscosity 1.15 mPa·s (DIN 53015; Höppler method; 4% strength aqueous solution) were initially introduced into a 6 liter glass reactor. The initially introduced mixture was cooled to 0° C. with stirring. 152 ml of butyraldehyde, precooled to −4° C., were then added in a period of 5 minutes and the batch was cooled to −2.0° C. At this temperature, 1114 ml of 20% strength HCl, precooled to −4° C., were added in order to induce the precipitation. The temperature increased as a result briefly to 0° C. A temperature of −2.0° C. was established in the course of 30 minutes by cooling. During the cooling, the initially clear batch became turbid at about −1.0° C., and the product was precipitated only 5 minutes after the beginning of the turbidity. After a reaction time of 40 minutes at −2.0° C., the temperature was increased to 20° C. over a period of 3 hours, and this temperature was maintained for a further 2 hours. Thereafter, the product was filtered and was washed under running, distilled water until the filtrate was neutral. Drying to a solids content of at least 98% was then effected, initially at 22° C., and then at 30° C. in a vacuum drying oven. A silicone-containing polyvinyl butyral in the form of a white powder having 13.9% by weight (28.0 mol %) of vinyl alcohol units, 4.9% by weight (5.0 mol %) of vinyl acetate units, 52.7% by weight (32.9 mol %) of vinyl butyral units and 28.5% by weight (34.1 mol %) of polydimethylsiloxane units was obtained (evaluation by 1H-NMR in $CDCl_3$ with trifluoroacetic acid as a shift solvent).

The viscosity (DIN 53015; Höppler method; 10% strength ethanolic solution) was 3.7 mPa·s. The ethanolic solution comprising the silicone-containing polyvinyl butyral had a single phase and colloidal turbidity (was slightly translucent).

Glass transition temperature (Tg): Tg=53.9° C.

Example 9

1720 ml of distilled water and 2350 ml of a 12.2% strength aqueous solution of the silicone-containing polyvinyl alcohol from example j), viscosity 1.15 mPa·s (DIN 53015; Höppler method; 4% strength aqueous solution) were initially introduced into a 6 liter glass reactor. A pH of 1.0 was established with 120 ml of 20% strength hydrochloric acid. The initially introduced mixture was cooled to 4.0C with stirring. 80 ml of acetaldehyde were then added in a period of 5 minutes. The temperature increased during this procedure to 6.0° C. Cooling to an internal temperature of 2.0° C. was then effected. 20 minutes after addition of the acetaldehyde, 102 ml of butyraldehyde were added at 2.0° C. The temperature increased to 3.2° C. during this procedure. The mixture was cooled again to 2.0° C. and the precipitation was induced by adding 706 ml of 20% strength HCl. During this procedure, the temperature increased to 6.1° C. and the product was precipitated. The suspension was cooled to 5.0° C. After a reaction time of 40 minutes at 5.0° C., the temperature was increased to 20° C. over a period of 3.5 hours, and this temperature was maintained for a further 2 hours. Thereafter, the product was filtered and was washed under running, distilled water until the filtrate was neutral. Drying to a solids content of at least 98% was then effected, initially at 22° C., and then at 30° C. in a vacuum drying oven.

A silicone-containing, mixed polyvinyl acetal in the form of a white powder having 12.2% by weight (23.9 mol %) of vinyl alcohol units, 5.6% by weight (5.5 mol %) of vinyl acetate units, 51.5% by weight (35.0 mol %) of vinyl acetal units and 30.7% by weight (35.6 mol %) of polydimethylsiloxane units was obtained (evaluation by 1H-NMR in $CDCl_3$ with trifluoroacetic acid as a shift solvent).

The viscosity (DIN 53015; Höppler method; 10% strength ethanolic solution) was 3.9 mPa·s. The ethanolic solution comprising the silicone-containing polyvinyl acetal had a single phase and colloidal turbidity (was slightly translucent).

Glass transition temperature (Tg): Tg=70.6° C.

Comparative Example 10

A commercial polyvinyl butyral (BN 18) from Wacker Polymer Systems having 80.0% by weight of vinyl butyral units, 2.0% by weight of vinyl acetate units and 18.0% by weight of vinyl alcohol units and a viscosity (10% strength in ethanol according to DIN 53015, Höppler method) of 16.2 mPa·s.

Testing of Performance Characteristics:

Qualitative determination of the release behavior or of the separation effect in the case of coatings which contain a silicone-containing polyvinyl acetal according to the invention, by means of Tesa test:

The silicone-containing polyvinyl acetals from examples 1 to 9 and the commercial polyvinyl butyral BN 18 of Wacker Polymer Systems (comparative example 10) were dissolved in EtOH in a concentration of 10% by weight. Commercial glass slides were then each coated with the corresponding solutions with the aid of a glass rod (layer thickness about 40 μm). A commercial Tesa tape from Beiersdorf, having a width of 1.5 cm and a length of 5 cm was adhesively bonded to the dried coating and pressed firmly onto the coating by means of a finger. The Tesa tape was then pulled off from the coating. The force required to remove the Tesa tape from the coating was determined.

The evaluation is effected using the rating system:

1 (very good): the Tesa tape can be removed very easily from the coating without exerting considerable force (very good separation effect); rating 6 (inadequate): the Tesa tape can be pulled off from the coating only by exerting a very high force (no separation effect).

The results are summarized in table 1.

Determination of the residual adhesive power of the Tesa Tape:

After the Tesa tape had been pulled off from the coating, a test was carried out to determine whether the Tesa tape still adhesively bonds. In all cases, no reduction in the tack of the Tesa tape was found—it always bonds just as well as initially. This means that no free silicone has migrated from the coating into the adhesive, which could have adversely affected its adhesive power.

TABLE 1

| Example | Silicone content [% by weight] | Separation effect (Rating) |
| --- | --- | --- |
| 1 | 13.2 | 1 |
| 2 | 13.6 | 2-3 |
| 3 | 14.9 | 1 |
| 4 | 24.9 | 1 |
| 5 | 12.6 | 2 |
| 6 | 20.9 | 1 |
| 7 | 22.5 | 1 |
| 8 | 28.5 | 1 |
| 9 | 30.7 | 1 |
| V10 | 0.0 | 6 |

Table 1 shows the following:

Even small amounts of silicone are sufficient to establish a separation effect in the case of coatings comprising silicone-containing polyvinyl acetals. This is shown by the comparison of examples 1 to 9 (silicone-containing polyvinyl acetals having a variable silicone content), in which the separation effect in the worst case was assessed with the rating 2-3, with comparative example V10 (commercial polyvinyl butyral without silicone), in which no separation effect at all could be found (rating 6).

In the case of other test methods, too, a fundamental difference was found between the silicone-containing polyvinyl acetals according to the invention and the conventional polyvinyl acetals. Thus, even small amounts of silicones which are covalently bonded to polyvinyl acetal chains result not only in an improvement in the separation effect in the case of coatings but also in an increase in the hydrophobicity, which was found using the water drop test. The contact angle of a water drop placed on the coating is always substantially higher with the use of silicone-containing polyvinyl acetals (in the coating) than in the case of conventional polyvinyl acetals. The time taken for the water drop placed on the coating to disappear or to be absorbed is also substantially longer with the use of silicone-containing polyvinyl acetals as coating materials than with the use of the conventional polyvinyl acetals.

The examples furthermore show that silicone-containing polyvinyl acetals—even if they have a relatively high molecular weight—are distinguished by a very low viscosity in organic solvents, such as EtOH. This has substantial advantages with regard to use in printing inks, compared with the conventional polyvinyl acetals.

The invention claimed is:

1. A silicone-containing polyvinyl acetal, prepared by a process comprising:

1) copolymerizing of
   a) one or more vinyl esters of straight-chain or branched alkylcarboxylic acids having 1 to 15 C atoms and
   b) one or more silicone macromers having at least one polymerizable group to form a copolymer, and
2) subsequently hydrolyzing the copolymer to give a silicone-containing polyvinyl alcohol and
3) subsequently acetalizing the silicone-containing polyvinyl alcohol with one or more aldehydes selected from the group consisting of aliphatic and aromatic aldehydes having 1 to 15 C atoms.

2. The silicone-containing polyvinyl acetal of claim 1, wherein the vinyl esters a) include one or more vinyl esters selected from the group consisting of vinyl acetate, vinyl propionate, vinyl butyrate, vinyl 2-ethyihexanoate, vinyl laurate, 1-methylvinyl acetate, vinyl pivalate and vinyl esters of a-branched monocarboxylic acids having 5 to 13 C atoms.

3. The silicone-containing polyvinyl acetal of claim 1, wherein the silicone macromers b) include one or more silicone macromers having the formula $R^1_a R_{3-a} SiO(SiRR^1O)_b (SiR_2O)_n SiR_{3-a}R^1_a$, each R independently being an identical or different monovalent, optionally substituted alkyl radical or alkoxy radical having 1 to 18 C atoms, each $R^1$ independently being a polymerizable group, a being 0 or 1, b being from 0 to 10 and n being from 3 to 1000, from 85 to 100% by weight of the silicone macromer containing at least one polymerizable group.

4. The silicone-containing polyvinyl acetal of claim 1, wherein alkenyl radicals having 2 to 8 C atoms or mercaptoalkyl groups having 1 to 6 C atoms are present as a polymerizable group $R^1$.

5. The silicone-containing polyvinyl acetal of claim 1, wherein at least one silicone macromer having a linear or branched structure is employed, where R=methyl, and where n is from 3 to 1000, said at least one silicone macromer containing one or two terminal, polymerizable groups, containing one or more polymerizable groups in the chain, or containing one or two terminal polymerizable groups and at least one polymerizable group in the chain.

6. The silicone-containing polyvinyl acetal of claim 1, wherein at least one silicone macromer comprises a binary or ternary mixture of linear or branched polydialkoxysiloxanes without a polymerizable group, in admixture with at least one linear or branched polydialkylsiloxane having one and/or two polymerizable groups.

7. The silicone-containing polyvinyl acetal of claim 1, wherein one or more silicone macromers are selected from the group consisting of α-monovinylpolydimethylsiloxanes, α-mono(3-acryloyloxypropyl)polydimethylsiloxanes, α-mono(acryloyloxymethyl)polydimethylsiloxanes, α-mono(methacryloyloxymethyl)polydimethylsiloxanes, α-mono (3-methacryloyloxypropyl)polydimethylsiloxanes, α,ω-divinylpolydimethylsiloxanes, α,ω-di (3-acryloyloxypropyl)polydimethylsiloxanes, α,ω-di(acryloyloxymethyl) polydimethylsiloxanes, α, ω-di(methacryloyloxymethyl) polydimethylsiloxanes, α,ω-di (3-methacryloyloxypropyl) polydimethylsiloxanes, αω-mono (3-mercapropropyl) polydimethylsiloxanes and α,ω-di(3-mercaptopropyl) polydimethylsiloxanes.

8. The silicone-containing polyvinyl acetal of claim 1, wherein butyraldehyde, optionally as a mixture with acetaldehyde, is used for acetalizing.

9. The silicone-containing polyvinyl acetal of claim 1, comprising from 0 to 30% by weight of vinyl ester units, from 5 to 95% by weight of vinyl alcohol units, from 3 to 94.9% by weight of vinyl acetal units, and having a silicone content of from 0.1 to 45 by weight, based on the total weight of the silicone-containing polyvinyl acetal, the weight percentages totaling 100% by weight.

10. A process for the preparation of a silicone-containing polyvinyl acetal of claim 1, comprising:

1) copolymerizing
   a) one or more vinyl esters of straight-chain or branched alkylcarboxylic acids having 1 to 15 C atoms, and
   b) one or more silicone macromers having at least one polymerizable group, to form a copolymer;
2) subsequently hydrolyzing the copolymer to give a silicone-containing polyvinyl alcohol; and
3) subsequently acetalizing the silicone-containing polyvinyl alcohol with one or more aldehydes selected from the group consisting of aliphatic and aromatic aldehydes having 1 to 15 C atoms.

11. The process of claim 10, wherein the copolymerizing is effected by mass polymerization, suspension polymerization, or polymerization in organic solvents.

12. The process of claim 11, wherein copolymerizing is effected in a nonaqueous, organic solvent in the presence of free radical initiators, the nonaqueous solvent used being a mixture of at least two nonaqueous solvents, at least one of which nonaqueous solvents has a transfer constant $C_s$ with respect to vinyl acetate of $C_s<20\times10^{-4}$ at 70° C.

13. The process of claim 10, wherein the hydrolysis is effected to a degree of hydrolysis of from 30 to 100 mol %.

14. A printing ink composition, comprising a silicone-containing polyvinyl acetal of claim 1 as a binder.

15. The printing ink composition of claim 14, comprising from 5 to 50% by weight of pigments, from 4 to 40% by weight of silicone-containing polyvinyl acetal binder, and solvent, said weight percents based on the total weight of said composition.

16. A laminated safety glass, glass laminate or window film, comprising a film or coating of at least one silicone-containing polyvinyl acetal of claim 1.

17. In a process for the preparation of an aqueous dispersion or a redispersible polymer wherein a protective colloid is employed, the improvement comprising selecting as at least one protective colloid, a silicone-containing polyvinyl acetal of claim 1.

18. A water-based or organic solvent-based finish, comprising a silicone-containing polyvinyl acetal of claim 1 as at least one binder.

19. In a corrosion inhibitor composition wherein a binder is employed, the improvement comprising selecting as at least one binder, a silicone-containing polyvinyl acetal of claim 1.

20. In a composition comprising at least one binder and at least one ceramic powder or metal powder, the improvement comprising selecting a silicone-containing polyvinyl acetal of claim 1 as a binder.

21. A can having an internal coating comprising a silicone-containing polyvinyl acetal of claim 1.

22. An article of one or more of wood, metal, glass, plastic, paper, having disposed thereon a coating comprising a silicone-containing polyvinyl acetal of claim 1.

23. In a process for the preparation of a release coating, a water repellant composition, a textile coating, a textile treating composition, a cosmetic composition, an antifoarn formulation, or a polish, the improvement comprising selecting as at least one ingredient thereof, a silicone-containing polyvinyl acetal of claim 1.

24. A construction composition containing at least one hydraulically seitable inorganic binder and at least one silicone-modified polyvinyl acetal of claim 1.

* * * * *

UNITED STATES PATENT AND TRADEMARK OFFICE

CERTIFICATE OF CORRECTION

PATENT NO. : 7,429,423 B2
APPLICATION NO. : 10/595102
DATED : September 30, 2008
INVENTOR(S) : Kurt Stark It is certified that error appears in the above-identified patent and that said Letters Patent is hereby corrected as shown below:

Column 20, Line 60, Claim 7:

Delete "αω-mono(3-mercaptopropyl)" and insert:

-- α-mono(3-mercaptopropyl) --.

Column 22, Line 32, Claim 24:

Delete "seitable" and insert: -- settable --.

Signed and Sealed this

Thirtieth Day of December, 2008

JON W. DUDAS
*Director of the United States Patent and Trademark Office*